US012025469B2

(12) United States Patent
Ding et al.

(10) Patent No.: US 12,025,469 B2
(45) Date of Patent: Jul. 2, 2024

(54) RANGING RETICLE FOR AN OPTICAL DEVICE

(71) Applicant: Leapers, Inc., Livonia, MI (US)

(72) Inventors: Tai-lai Ding, Northville, MI (US); Kenneth Chersack, Jackson, MI (US)

(73) Assignee: Leapers, Inc., Livonia, MI (US)

( * ) Notice: Subject to any disclaimer, the term of this patent is extended or adjusted under 35 U.S.C. 154(b) by 33 days.

(21) Appl. No.: 17/699,886

(22) Filed: Mar. 21, 2022

(65) Prior Publication Data

US 2023/0296377 A1 Sep. 21, 2023

(51) Int. Cl.
*F41G 1/38* (2006.01)
*G01C 3/04* (2006.01)

(52) U.S. Cl.
CPC ............... *G01C 3/04* (2013.01); *F41G 1/38* (2013.01)

(58) Field of Classification Search
CPC ... F41G 1/38; F41G 1/473; F41G 3/06; G01C 3/00; G01C 3/04; G02B 23/00
USPC .................................... 42/119, 122, 130, 142
See application file for complete search history.

(56) References Cited

U.S. PATENT DOCUMENTS

| | | | |
|---|---|---|---|
| 1,190,121 A | 7/1916 | Critchett | |
| 3,492,733 A | 2/1970 | Leatherwood | |
| 3,948,587 A * | 4/1976 | Rubbert | G01C 3/04 |
| | | | 359/422 |
| 4,263,719 A * | 4/1981 | Murdoch | G02B 23/10 |
| | | | 33/297 |
| 4,403,421 A | 9/1983 | Shepherd | |
| 6,453,595 B1 | 9/2002 | Sammut | |
| 6,516,699 B2 | 2/2003 | Sammut et al. | |
| 6,681,512 B2 | 1/2004 | Sammut | |
| 7,434,345 B2 * | 10/2008 | Verdugo | F41G 1/38 |
| | | | 42/144 |
| 7,712,225 B2 | 5/2010 | Sammut | |
| 7,832,137 B2 | 11/2010 | Sammut et al. | |
| 7,856,750 B2 | 12/2010 | Sammut et al. | |
| 7,937,878 B2 | 5/2011 | Sammut et al. | |
| 7,946,048 B1 | 5/2011 | Sammut | |
| 8,109,029 B1 | 2/2012 | Sammut et al. | |
| 8,230,635 B2 | 7/2012 | Sammut et al. | |
| 8,353,454 B2 | 1/2013 | Sammut et al. | |

(Continued)

*Primary Examiner* — Joshua E Freeman
*Assistant Examiner* — Benjamin S Gomberg
(74) *Attorney, Agent, or Firm* — Warner Norcross + Judd LLP

(57) ABSTRACT

A multi-distance ranging reticle for an optical device is provided. The reticle can include a primary vertical crosshair transverse to a primary horizontal crosshair, a secondary horizontal crosshair having a first vertical marking and a second vertical marking, separated by a distance, the secondary horizontal crosshair corresponding to a first range. A first object having a first known width can be placed between the first and second vertical markings to estimate a first estimated range to the first object. An assortment of other vertical markings can be disposed along the secondary horizontal cross hair, and/or other additional horizontal crosshairs and separated by other distances corresponding to other known widths of other objects. By selectively framing an object of a known width between certain vertical markings along a particular horizontal crosshair, a user can quickly and efficiently estimate range of the object. A related method of use is provided.

20 Claims, 6 Drawing Sheets

(56) References Cited

U.S. PATENT DOCUMENTS

| | | |
|---|---|---|
| 8,656,630 B2 | 2/2014 | Sammut |
| 8,707,608 B2 | 4/2014 | Sammut et al. |
| D704,295 S | 5/2014 | Hodge et al. |
| 8,756,852 B2 * | 6/2014 | Kramer .................. F41G 1/473 42/130 |
| 8,893,971 B1 | 11/2014 | Sammut et al. |
| 8,905,307 B2 | 12/2014 | Sammut et al. |
| 8,959,824 B2 | 2/2015 | Sammut et al. |
| 8,966,806 B2 | 3/2015 | Sammut et al. |
| 8,991,702 B1 | 3/2015 | Sammut et al. |
| 9,068,794 B1 | 6/2015 | Sammut |
| 9,250,038 B2 | 2/2016 | Sammut et al. |
| 9,255,771 B2 | 2/2016 | Sammut et al. |
| D753,785 S | 4/2016 | Silvers et al. |
| 9,335,123 B2 | 5/2016 | Sammut |
| 9,435,610 B2 | 9/2016 | Silvers et al. |
| 9,459,077 B2 | 10/2016 | Sammut et al. |
| 9,500,444 B2 | 11/2016 | Sammut et al. |
| 9,574,850 B2 | 2/2017 | Sammut et al. |
| 9,612,086 B2 | 4/2017 | Sammut et al. |
| D805,156 S | 12/2017 | Noller et al. |
| 9,869,530 B2 | 1/2018 | Sammut et al. |
| 10,060,703 B2 | 8/2018 | Sammut et al. |
| 10,073,277 B2 * | 9/2018 | Plumb .................... G02B 27/32 |
| 10,197,361 B1 * | 2/2019 | Wu ........................ G02B 27/32 |
| 10,254,082 B2 | 4/2019 | Sammut et al. |
| 10,295,307 B2 | 5/2019 | Sammut et al. |
| D855,739 S | 8/2019 | Doran |
| 10,451,385 B2 | 10/2019 | Sammut et al. |
| 10,458,753 B2 | 10/2019 | Sammut et al. |
| 10,488,153 B2 | 11/2019 | Sammut et al. |
| 10,488,154 B2 | 11/2019 | Sammut et al. |
| 10,502,529 B2 | 12/2019 | Sammut et al. |
| 10,731,948 B2 | 8/2020 | Sammut et al. |
| 10,788,290 B2 | 9/2020 | Gallery et al. |
| 10,823,532 B2 | 11/2020 | Gallery et al. |
| 10,895,433 B2 | 1/2021 | Gallery et al. |
| 10,895,434 B2 | 1/2021 | Sammut et al. |
| 10,948,265 B2 | 3/2021 | Sammut et al. |
| 10,976,135 B1 * | 4/2021 | Holland .................... F41G 1/38 |
| D919,460 S | 5/2021 | Gallery et al. |
| 11,041,694 B1 * | 6/2021 | Holland .................... F41G 1/38 |
| 11,181,342 B2 | 11/2021 | Sammut et al. |
| 11,313,649 B1 * | 4/2022 | Johnson .................... G01C 3/00 |
| 2002/0124452 A1 | 9/2002 | Sammut |
| 2003/0010190 A1 | 1/2003 | Sammut et al. |
| 2006/0236586 A1 * | 10/2006 | Zaderey .................... F41G 1/38 42/133 |
| 2007/0044364 A1 | 3/2007 | Sammut et al. |
| 2008/0248449 A1 | 10/2008 | Sammut |
| 2009/0235570 A1 | 9/2009 | Sammut et al. |
| 2011/0089238 A1 | 4/2011 | Sammut et al. |
| 2011/0132983 A1 | 6/2011 | Sammut et al. |
| 2011/0219634 A1 | 9/2011 | Sammut |
| 2012/0137567 A1 | 6/2012 | Sammut |
| 2012/0144720 A1 * | 6/2012 | Lacorte .................... F41G 1/38 42/130 |
| 2013/0014421 A1 | 1/2013 | Sammut et al. |
| 2014/0059914 A1 | 3/2014 | Sammut et al. |
| 2014/0059915 A1 * | 3/2014 | Sammut .................... F41G 3/00 42/122 |
| 2014/0068993 A1 * | 3/2014 | Mikroulis ................ F41G 3/08 42/122 |
| 2014/0109459 A1 | 4/2014 | Sammut et al. |
| 2014/0123533 A1 | 5/2014 | Sammut et al. |
| 2014/0166751 A1 | 6/2014 | Sammut et al. |
| 2014/0339307 A1 | 11/2014 | Sammut et al. |
| 2014/0360083 A1 | 12/2014 | Sammut |
| 2014/0361079 A1 | 12/2014 | Sammut et al. |
| 2014/0373424 A1 * | 12/2014 | Silvers .................... F41G 1/38 42/122 |
| 2015/0020431 A1 | 1/2015 | Sammut et al. |
| 2015/0168105 A1 | 6/2015 | Sammut et al. |
| 2015/0198419 A1 | 7/2015 | Sammut |
| 2015/0226522 A1 | 8/2015 | Sammut et al. |
| 2015/0253108 A1 * | 9/2015 | Fischer .................... F41G 3/06 42/122 |
| 2015/0362287 A1 | 12/2015 | Sammut et al. |
| 2016/0010950 A1 | 1/2016 | Sammut et al. |
| 2016/0153749 A1 | 6/2016 | Sammut et al. |
| 2016/0252325 A1 * | 9/2016 | Sammut .................. G01S 19/13 42/122 |
| 2016/0377380 A1 | 12/2016 | Sammut |
| 2017/0176141 A1 * | 6/2017 | Kedairy .................... F41G 1/38 |
| 2017/0205197 A1 | 7/2017 | Sammut et al. |
| 2017/0254621 A1 | 9/2017 | Sammut et al. |
| 2017/0268850 A1 | 9/2017 | Sammut et al. |
| 2017/0299333 A1 | 10/2017 | Sammut et al. |
| 2018/0003463 A1 | 1/2018 | Sammut et al. |
| 2018/0081192 A1 * | 3/2018 | Qu .......................... F41G 1/38 |
| 2018/0120061 A1 | 5/2018 | Sammut et al. |
| 2018/0164073 A1 | 6/2018 | Sammut et al. |
| 2018/0224243 A1 | 8/2018 | Sammut et al. |
| 2019/0017783 A1 | 1/2019 | Sammut et al. |
| 2019/0226808 A1 | 7/2019 | Gallery et al. |
| 2019/0257618 A1 * | 8/2019 | Mikroulis ................ F41G 1/38 |
| 2019/0257619 A1 | 8/2019 | Sammut et al. |
| 2019/0310053 A1 | 10/2019 | Sammut et al. |
| 2020/0049456 A1 | 2/2020 | Sammut et al. |
| 2020/0050011 A1 | 2/2020 | Hamilton et al. |
| 2020/0064103 A1 | 2/2020 | Sammut et al. |
| 2020/0072576 A1 * | 3/2020 | Gallery .................. G02B 27/32 |
| 2020/0124380 A1 | 4/2020 | Sammut et al. |
| 2020/0132415 A1 | 4/2020 | Gallery et al. |
| 2020/0408490 A1 | 12/2020 | Gallery et al. |
| 2021/0033370 A1 | 2/2021 | Hodnett et al. |
| 2021/0080225 A1 | 3/2021 | Sammut et al. |
| 2021/0123705 A1 | 4/2021 | Gallery et al. |
| 2021/0123706 A1 | 4/2021 | Sammut et al. |
| 2021/0231405 A1 | 7/2021 | Sammut et al. |
| 2021/0278173 A1 * | 9/2021 | Mikroulis ................ F41G 1/473 |
| 2021/0396493 A1 | 12/2021 | Sammut et al. |
| 2022/0082354 A1 * | 3/2022 | Mikroulis ................ F41G 1/38 |
| 2022/0113117 A1 * | 4/2022 | Hamilton ................ F41G 3/08 |
| 2023/0288171 A1 * | 9/2023 | Mikroulis ................ F41G 1/38 42/122 |
| 2023/0296377 A1 * | 9/2023 | Ding ........................ F41G 1/38 42/122 |

* cited by examiner

RANGING RETICLE FOR AN OPTICAL DEVICE

BACKGROUND OF THE INVENTION

The present invention relates to aiming devices, and more particularly to optical scopes configured to provide shooting accuracy at close, medium and long ranges to targets.

The popularity of target shooting and other dynamic shooting sports has increased over the past several decades. The competitive nature of shooting and the desire to achieve well placed shots has led to the development and commercialization of a variety of aiming devices. A popular aiming device for short, medium and long range shooting is the optical scope.

Optical scopes are usually used on firearms, such as rifles, shotguns and handguns to aid the user in aiming at and precisely engaging a target when firing the firearm. A scope is typically mounted atop the firearm in a location above, and longitudinally aligned with, a barrel of the firearm. The scope, via its reticle, defines an aiming point coincident with the point of impact of a projectile, such as a bullet, on a target. The reticle can be in the form of a cross-hair with a variety of elements that indicate elevation holdover, horizontal or windage holdover or ranging features.

The ranging features can be used to estimate a range to a target from the user. The ranging features typically can be Miliradians (mil) dots disposed vertically one above the other on a vertical cross hair. A user can place a vertical object, such as a human silhouette, within a plurality of those mil dots, vertically disposed one over the other, then count the number of mil dots covering the object. With the height of the object known, for example, a human silhouette being 72 inches, the user can plug that height and the number of mil dots, or size in mils, covering the object into the following equation to estimate range.

$$\frac{(\text{Target Size in Inches}) \times 27.77}{\text{Size in } MILS} = \text{Yards to Target}$$

After range is estimated, the user can adjust the reticle to engage the object at the calculated range when the weapon is fired.

Although mil dots are helpful to estimate range, they sometimes can be too complex for some users. For example, a user needs to memorize or look up the size and spacing of the mil dots and their spacing from one another to properly use them. A user also will need to have a keen mental calculator or use a calculating device to properly use the ranging formula above. Sometimes, a user will be under stress when shooting, so the calculations might not be accurate, which can decrease aiming efficiency and shot placement when they are important. While other ranging features have been used in place of mil dots, those also typically require the use of other formulae and subsequent movement of the vertical cross hair up or down to place an appropriate feature over an object at a calculated range.

Accordingly, there remains room for improvement in scopes, and in particular, reticles with enhanced and efficient ranging functionality in such scopes.

SUMMARY OF THE INVENTION

A multi-distance ranging reticle for an optical device is provided. The reticle can include a primary vertical crosshair transverse to a primary horizontal crosshair, and at least one secondary horizontal crosshair having a first vertical marking and a second vertical marking along it, separated by a distance, the secondary horizontal crosshair corresponding to a range. By selectively framing an object of a known width between certain vertical markings along the secondary horizontal crosshair, a user can quickly and efficiently estimate a range or distance to the object.

In one embodiment, the reticle can be configured so that a first object having a first known width can be placed between or framed within the first and second vertical markings to estimate a first estimated range to the first object. An assortment of other vertical markings can be disposed along the secondary horizontal cross hair, or other additional horizontal crosshairs, and separated by other distances corresponding to other known widths of objects.

In another embodiment, the reticle can include a first horizontal row of indicia and a second horizontal row of indicia, either of which can be any wind bars or other markings for wind or moving targets or other things, below the primary horizontal crosshair.

In still another embodiment, the third horizontal row of indicia can include a secondary horizontal crosshair extending on a first lateral side and on a second lateral side away from the primary vertical crosshair. The third horizontal row of indicia can be associated with a first range. The secondary horizontal crosshair can include a first vertical range marking projecting vertically away from it and a second vertical range marking projecting vertically away from it and distal from the first vertical range marking.

In yet another embodiment, the first vertical marking and the second vertical marking can be spaced a first distance from one another. That first distance can correspond to a first width of a first object in a field of view of the user viewing the reticle. The first width can be a first known width with which the user is familiar or has memorized. For example, the first width can be the width of a human silhouette, for example, about 18 inches, or the width of a human appendage, for example, about 12 inches, or some other width, or even half increments of those widths or others.

In a further embodiment, the secondary horizontal crosshair can be transverse to the primary vertical crosshair, which can be interrupted by Milliradian (mil) dots. The secondary cross hair also can be interrupted by the mil dots where it crosses the primary vertical crosshair. The mil dots can be in the form of a solid dot, an empty dot or circle, or other geometric shape depending on the application, with or without a smaller dot inside the circle or other geometric shape.

In still a further embodiment, the secondary crosshair can include multiple vertical markings to the left of the primary vertical cross hair and to the right of the primary vertical crosshair. The vertical markings on the left and right can be paired across the primary vertical crosshair to establish framing openings within which a target or object, which terms are used interchangeably herein, of a known width can be placed to estimate range to the object. Based on that range, the user, knowing the holdover for bullet drop compensation, can move the vertical crosshair up or down relative to the object so that if the optical device is used with a weapon, a shot can be well placed.

In yet a further embodiment, the vertical markings on one side can be used with only the primary vertical crosshair to establish frame openings, which can be half or some other proportion of larger frame openings between paired corresponding vertical markings to the left and right of the primary vertical crosshair. Thus, with the vertical markings in this format, objects of multiple known widths can be framed between paired vertical markings on opposite sides, or between a vertical marking on one side and the primary vertical cross hair.

In even a further embodiment, the vertical markings can extend above and below the secondary horizontal crosshair on opposite sides of the primary vertical crosshair. The ones above this crosshair can be paired to frame certain width objects, and the ones below this crosshair can be paired to frame other width objects. When the object width fits inside a particular pair of markings, a user can refer to the particular secondary vertical crosshair and its associated range to establish an estimated range to the target.

In a further embodiment, the reticle can include another secondary horizontal crosshair, sometimes referred to as a tertiary horizontal crosshair, which can be associated with a second range different from the first range, perhaps greater than the first range. That tertiary horizontal crosshair can be associated with another row of indicia in some cases. The tertiary horizontal crosshair can include its own set of paired vertical markings above and/or below it, set at distances that correspond, in whole or part, to known widths of objects.

In still a further embodiment, a method of using the optical device reticle can include providing a primary vertical crosshair that is substantially perpendicular to a primary horizontal crosshair; and framing a first object having a first width such that the first width is horizontally disposed between a first vertical marking and a second vertical marking disposed along a secondary horizontal crosshair that is vertically offset from the primary horizontal crosshair, the secondary horizontal crosshair corresponding to a first range, whereby a user of the reticle can estimate a first estimated range to the first object.

In yet a further embodiment, the method of using the reticle can include framing the first object having the first width such that the first width is horizontally disposed between a third vertical marking and a fourth vertical marking disposed along a tertiary horizontal crosshair that is vertically offset from the primary horizontal crosshair and the secondary horizontal crosshair, the tertiary horizontal crosshair corresponding to a second range; and determining whether the first range or the second range is closer to the first estimated range based on the framing.

In even a further embodiment, the method of using the reticle can include moving the reticle so that the first object is closer to the secondary horizontal crosshair or the tertiary horizontal crosshair.

In another embodiment, the method of using the reticle can include estimating the first estimated range based on the framing; and moving the reticle based on the estimating to a known holdover point or aiming point along the primary vertical reticle, based on whether the first estimated range is closer to the first range or the second range.

The reticle for an optical device of the current embodiments can provide a quick and efficient ranging tool and method if the horizontal or side to side width of an object is known. Where the reticle includes a secondary horizontal crosshair associated with a predetermined range, a user can frame an object of known width between a pair of vertical markings associated with that crosshair and estimate a range to the target. The user can also use an assortment of different paired vertical markings on that secondary crosshair or yet another one, to frame the width of the object and quickly estimate range. The reticle facilitates very simple and quick ranging merely by knowing a width of an object and memorizing measurement values associated with distances between paired vertical markings and/or between vertical markings and the primary vertical crosshair or other elements.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

A multi-ranging reticle of an optical device of a current embodiment is shown in FIGS. 1-7 and generally designated 10. The optical device 1 can be in the form of an optical scope as shown, but of course, it can be in the form of an electronic sighting system, a night vision or thermal scope, a camera, a spotting scope, or any type of optical or viewing system for use with a variety of other articles. Although shown in the form of a fixed objective, single power scope, the optical device 1 can be an adjustable objective scope and optionally can be of varying magnification. Various mechanisms, such as an adjustable objective and a magnification system can be included on the device 1 depending on the application.

Figure 1:
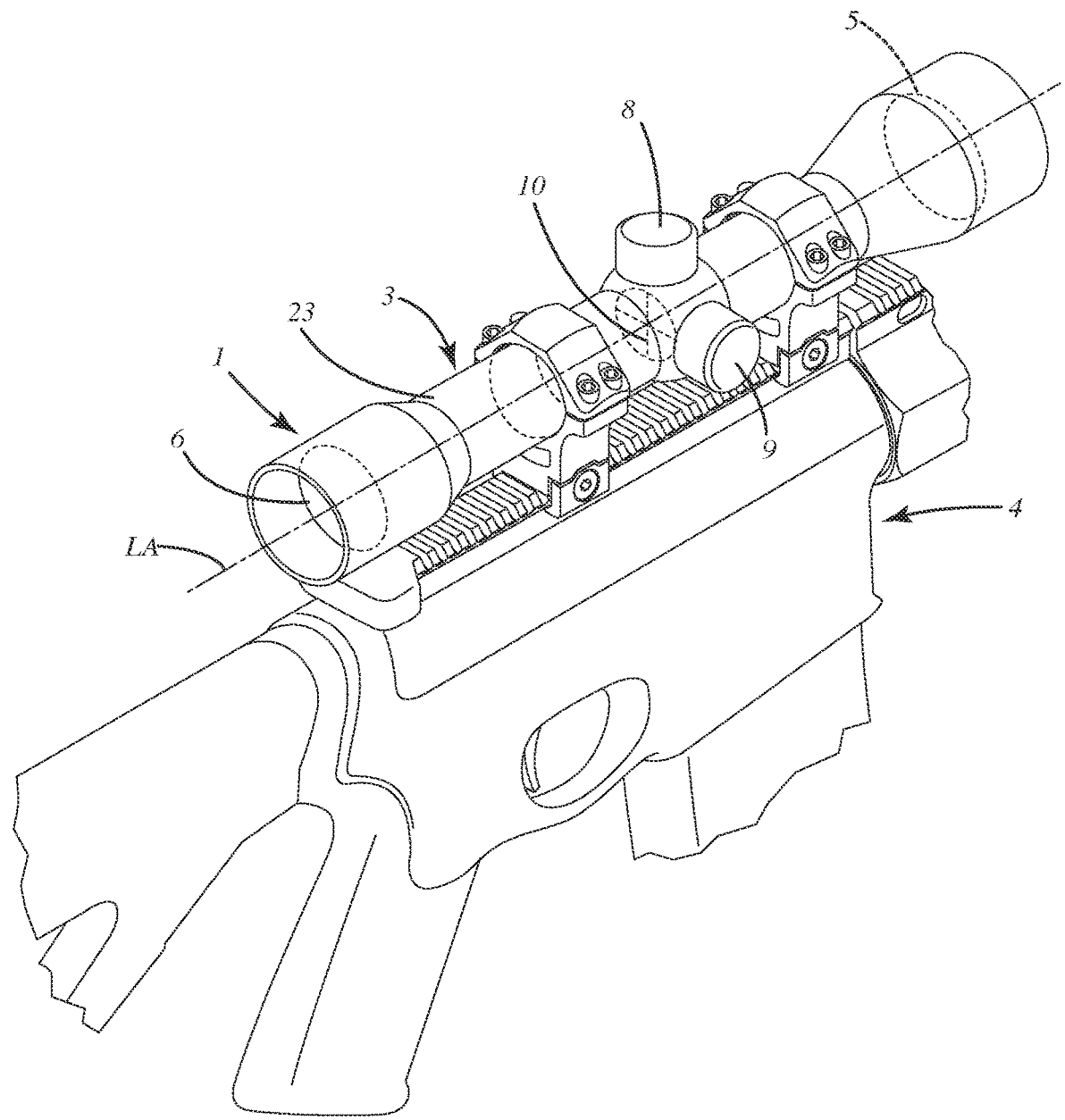
FIG. 1 is a perspective view of an optical device including the multi-ranging reticle of the current embodiment mounted on an exemplary weapon.
Figure 3:
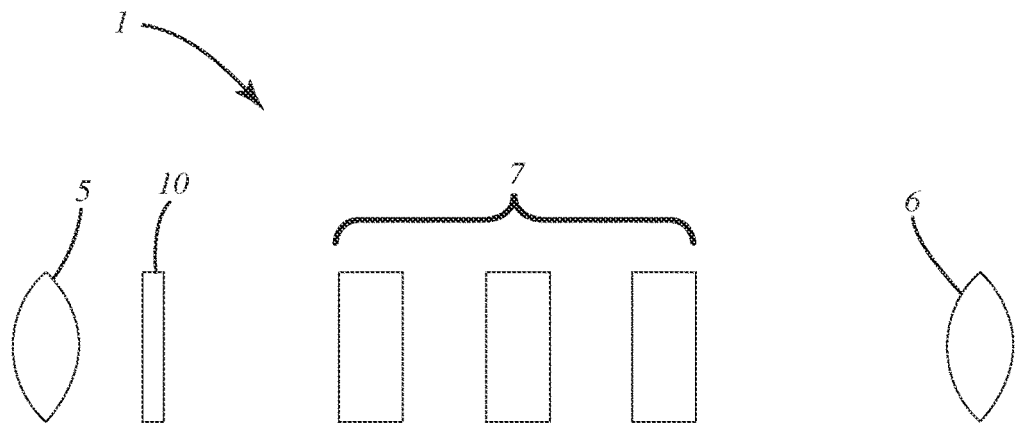
FIG. 3 is a schematic view of exemplary components of the optical device.

The optical device as shown in FIGS. 1 and 3 can be in the form of a telescopic rifle or weapon scope 2, also referred to as a "scope" including a housing 3 which can be mounted in fixed relationship with a weapon 4. The housing can be constructed steel, aluminum, composites or other materials. The housing 3 can house at one end an objective lens or lens assembly 5 and at the opposite end is an ocular lens or lens assembly 6. As used herein, "lens" can refer to an object that focuses or projects light, thermal, sonar, infrared, ultraviolet, microwave or radiation of other wavelength to form an image. A lens can include a lens constructed from a single piece of optical glass or other material, or multiple pieces of optical glass or other material, such as an achromatic lens, or from more than one piece mounted together to focus light, or from other material capable of focusing light. Lenses contemplated herein can be based on digital, hydrostatic, ionic, electronic, magnetic energy fields, component, composite, plasma, adoptive lens, or other related technology.

Optionally, moveable or adjustable lenses can be used in the optical device L For example, as shown in FIG. 3, the optical device can include variable power optical components 7, such as magnifiers and/or erectors. Such a variable power scope can permit the user to select a desired power within a predetermined range of powers or magnifications.

The optical device 1 can be used with any type of projectile shooting device, such as a firearm. For example, the aiming device can be used with and mounted to a handgun, such as a pistol and/or a revolver; a rifle, such as a long rifle, a carbine, a bolt rifle, a pump rifle or a battle rifle; a shotgun and/or a machine gun, such as a machine pistol, a light machine gun, a mini gun, a medium machine gun, a heavy machine gun, a belt fed gun and Gatling gun. The firearm can include any type of action, for example, bolt action, lever action, pump action and/or break action. The firearm can be single shot, automatic and/or semiautomatic.

The reticle 10 of the current embodiment can be constructed with optical material, such as optical glass or plastic, or similar transparent material, and can be in the form of a disc having substantially front and rear surfaces. The reticle and more particularly its visible components can be constructed from etchings, or may be analog or digitally printed, or may be projected by a mirror, video, holographic projection, or other suitable projector. Optionally, the reticle can be in the form of an illuminated reticle that is etched, with the etching having disposed thereon a reflective material such as titanium oxide, which illuminates when a light or diode is powered. The light or diode can be illuminated in different colors to the user's preference. Further optionally, the illuminated reticle can include different images, of different colors, depending on the application.

As illustrated in FIG. 1, the optical device 1 can include a reticle 10 that can be moved to adjust elevation and windage via manual manipulation of the respective adjustment turrets 8, 9 which are joined with the scope housing at the bell 4. These adjustment turrets can be similarly configured and generally conventional, and will not be described in detail.

Figure 2:
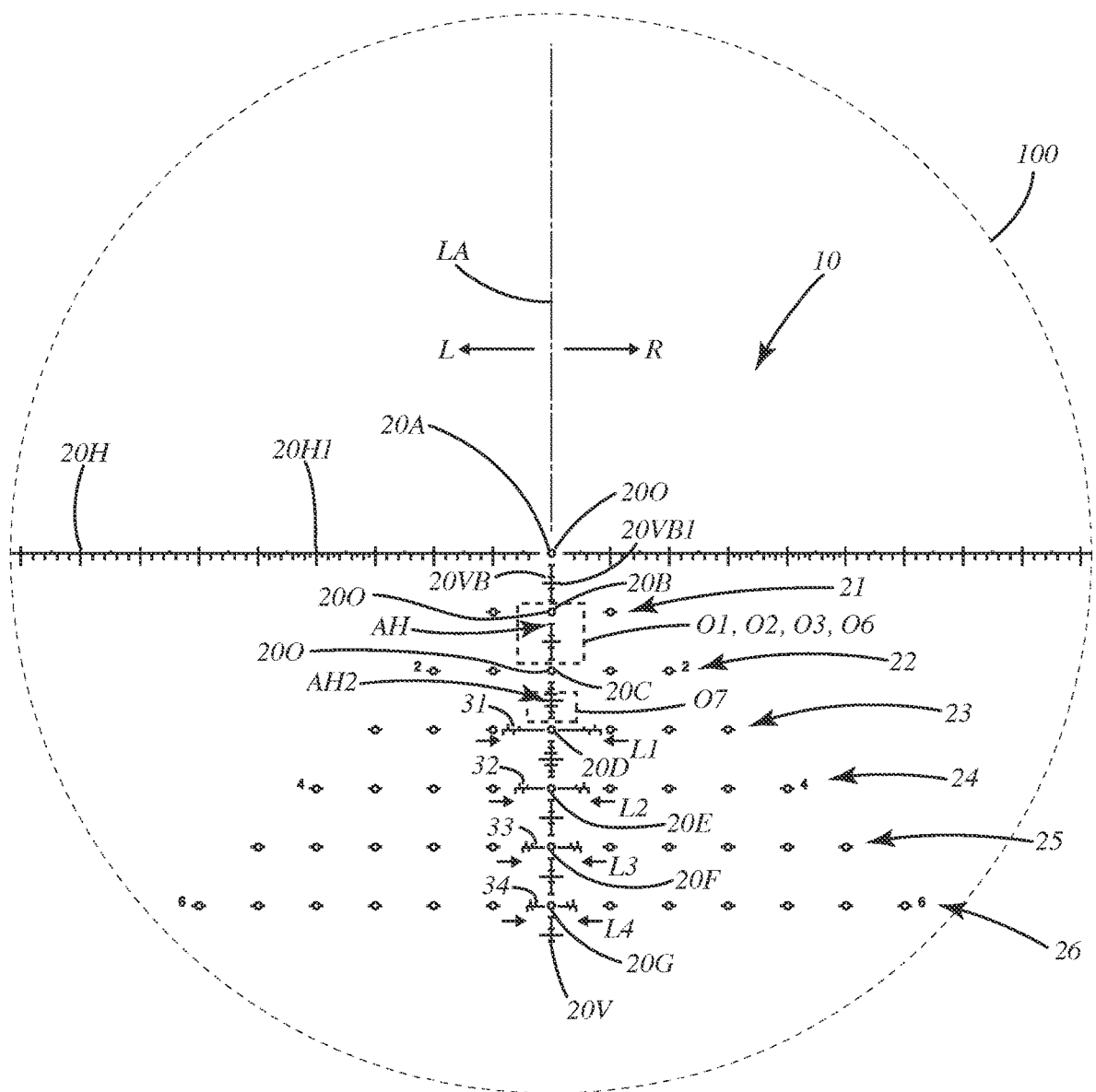
FIG. 2 is a rear view of the reticle, showing the markings as viewed through a zoom telescopic optical device, such as a rifle scope, at low power.

With reference to FIG. 2, the reticle 10 can include a primary vertical crosshair 20V and a primary horizontal crosshair 20H, which can be included on the disc or transparent plate 10P of the reticle via etching, printing, engraved by machine or burning by laser, or applying hairs or wires of known diameter to the disc 10P. The primary vertical crosshair 20V can bisect the disc 10P and intersect the optical center of the reticle 10. The primary horizontal crosshair 20H can intersect the primary vertical crosshair 20V at the optical center as well. The primary vertical crosshair and the primary horizontal crosshair can form four sectors: an upper right sector or quadrant, an upper left sector, a lower left sector, and a lower right sector, when viewed through a scope mounted to a weapon.

Optionally, as shown, the primary vertical and horizontal crosshairs can be interrupted, with openings 20O. At those openings, the ends of the crosshairs can be separated from one another a distance. Within each of those openings, a dot, circle, cross, hash or hack mark, line, or other indicia can be located and disposed, generally centered between the ends of the respective crosshairs. The dots on the primary vertical crosshair, which can extend up to the primary horizontal crosshair and optionally terminate without passing above the primary horizontal crosshair, can be in the form of Milliradian dots, or mil dots as used herein. These mil dots 20A-20G can be spaced along the primary vertical crosshair 20V within openings or interruptions in that crosshair and optionally evenly spaced as shown. Of course, in other embodiments, those mil dots can be unevenly spaced along the primary vertical crosshair, or right along the primary vertical crosshair, not in any openings or interruptions, such that the primary vertical crosshair is continuous.

The primary horizontal crosshair 20H can extend laterally across the disc 10D upon which the reticle 10 is disposed or projected. The primary horizontal crosshair 20H and the reticle 10 itself can be bifurcated into a first lateral side L and a second lateral side R which can optionally correspond to left and right sides of the reticle 10 when bisected down its geometric center, optionally along the primary vertical crosshair. The primary horizontal crosshair 20H can include multiple evenly spaced vertical bars 20H1 which can be scaled to provide windage and/or other holdover distances relative to an object at a distance over which the reticle 10 is disposed in an aiming or viewing activity by user. Although not shown, the various markings or bars along the horizontal crosshair can be marked with alphanumeric characters for easy reference.

The central upper mil dot 20A can be disposed at the opening 20O between the ends of the primary horizontal crosshair 20H and at an upper or other end of the primary vertical crosshair 20V. When the reticle 10 is used to zero a weapon to which it is attached, the primary mil dot 20A can be the aiming and/or impact point of the reticle and the optical device 1 in general. The mil dots 20B-20G can be centered along the primary vertical crosshair 20V and can be disposed in or form portions of rows of indicia oriented one over the other, vertically below the primary horizontal crosshair.

As used herein, a row of indicia can include two or more wind markings or other markings to the left and/or to the right of the primary vertical crosshair below the intersection, whether an actual intersection, an open space where intersection would occur, and/or a dot, circle, cross or other indicia where the intersection would occur, of the primary horizontal crosshair and the primary vertical crosshair. The wind markings or indicia can be any of a dot (of any geometric shape or size), an empty circle or other geometric shape, an empty circle with a dot in the center, an empty circle with lines projecting laterally or vertically therefrom, a cross, a line, an uninterrupted line, an interrupted line, a number and/or a line having two or more numbers. Optionally, the indicia or wind markings to the left and to the right of the primary vertical crosshair below the actual or implied intersection of the primary horizontal crosshair and the primary vertical crosshair can be calibrated for the velocity of a target, properties of a projectile, properties of a firearm, or properties of the environment, such as wind speed, wind direction and wind angle. Further embodiments comprise velocity of a target markings above or below the primary horizontal cross-hair. In some embodiments, the wind markings to the left and to the right of the primary vertical cross hair can be arranged in vertically curvilinear lines.

As further shown in FIG. 2, the reticle 10 can include a first horizontal row of indicia below the primary horizontal crosshair. The first horizontal row of indicia 21 can include a first dot 23A on the first lateral side L and a second dot 23B on the second lateral side R. Between these two indicia, another mil dot 20B can be disposed and generally aligned with or centered in an opening 20O of the primary vertical crosshair 20V.

Between the mil dot 20B and the central mil dot 20A, another sub part 20VB of the primary vertical crosshair 20V can be disposed. This subpart can be an elongated bar that is vertically disposed and is segmented by one or more horizontal bars. Optionally, the central bar 20VB1 can be disposed halfway between the mil dot 20A and the mil dot 20B. This can allow a user to use that bar 20VB1 as a measurement of ½ Milliradian, or alternatively use that bar or other respective bars as an aiming point or indicating an appropriate holdover for the reticle at a particular range to a target or object. The other horizontal bars on the subpart 20VB can further equally segment the distance between the mil dot 20A and 20B into equal distances, which can be proportions of a Milliradian between those respective mil dots, or which can alternatively be used as an aiming point indicating an appropriate holdover for the reticle at a particular range to a target or object.

The subpart 20VB of the primary vertical crosshair 20V can be replicated between other rows of indicia or secondary horizontal crosshairs as described below, depending on the application. It will be noted further that these subparts also can be eliminated from the primary vertical crosshair 20V, with only the respective mil dots 20A-20G left in place to form the primary vertical crosshair. Indeed in some cases, the primary vertical crosshair need not include any vertical lines but rather a multitude of dots, markings or other indicia aligned generally in a vertical orientation one above the other that intersects and/or extends toward, in a perpendicular manner the primary horizontal crosshair 20H. Likewise the primary horizontal crosshair 20H can be replaced such that it include similar dots markings or other indicia that are aligned generally in a horizontal orientation and extending sideways across the disc 10D upon which the reticle 10 is disposed.

As illustrated in the embodiment of FIG. 2, the indicia to the left and right of the mil dot 20B can be in the form of dots. Optionally these dots can be further in the form of empty circles having lateral bars extending leftward and rightward therefrom along a common horizontal line. Each of the empty circles can include at their center a minuscule mini-dot or other marking. Further optionally, each of the dots to the left and right of the dot 20B laying along the primary vertical crosshair can lay distance from that dot 20B that is equal to the distance between that mil dot 20B and the mil dot 20A. In other words, the spacing of the indicia along each of the rows of indicia can be the same as the spacing between vertical dots 20A-20G along the vertical primary vertical crosshair 20V. Of course, in other applications, the spacing of the indicia along the horizontal rows can vary from that of the spacing of the vertical mil dots.

As further shown in FIG. 2, the reticle 10 can include a second horizontal row of indicia 22 below the primary horizontal crosshair 20H as well as below the first horizontal row of indicia 21. This row can include at least two or more indicia to the left L and/or to the right R of the primary vertical crosshair 20V and the respective mil dot 20C laying along the primary vertical crosshair 20V. FIG. 2 also shows a third row of indicia 23 below the primary horizontal crosshair, the first horizontal row of indicia 21 and the second horizontal row of indicia 22. This third horizontal row of indicia 23 can be generally centered along the primary vertical crosshair 20V and can include a central mil dot 20D that lays along that central vertical crosshair 20V. This third row of indicia can include more indicia to the left and to the right of the primary vertical crosshair than the first row and second row of indicia above it. Optionally, those first and second rows can be deleted from the configuration of the reticle 10 as shown. The third horizontal row of indicia 23 can be associated with a first range. For example, the third row can be associated with a first range of 300 yards. Although not shown, this first range of 300 yards can be indicated with a number "3" at the ends of the third row if desired.

As further shown in FIG. 2, the third horizontal row of indicia 23 can include a secondary horizontal crosshair 31 which can be embedded within the third horizontal row of wind dish and can extend left and right on first and second lateral sides L and R of the primary vertical crosshair 20V. This secondary horizontal crosshair 31 can extend away from that primary vertical crosshair 20V on the first lateral side L and on the second lateral side R toward first and second wind dish are respectively on those first and second lateral sides. The secondary horizontal crosshair 21 however can terminate short of those respective first and second indicia. Indeed, the second horizontal crosshair 31 can be centered between those first indicia on the left and right sides of the primary vertical crosshair 20V. This secondary horizontal crosshair 21 can be of an overall length L1 that extends across and transverse to the primary vertical crosshair 20V. The details of this secondary horizontal crosshair 31 are described in further detail below.

The reticle 10 can include a fourth row of indicia 24 disposed below the third row 23. This fourth row can likewise be disposed between the rows of indicia 21, 22 above that as well as the primary horizontal crosshair 20H. This row likewise can include an increasing number of indicia disposed to the left L and to the right R of the primary vertical crosshair 20V. The number of indicia in this row can be greater than the number of indicia in the row 23 above it. The fourth horizontal row of indicia 24 can be associated with a second range that is different from the first range of the third row. For example, the third row can be associated with a first range of 300 yards and the fourth row can be associated with a second range of 400 yards. This range correspondence can be indicated via an alphanumeric character, such as the "4" at the ends of row 24.

This fourth row 24 also can include another secondary horizontal crosshair 32 that extends laterally on the first and second lateral sides L and R, generally away from the central mil dot 20E laying along the row 24. This secondary crosshair 32 however can be of a shorter length L2 than the length L1 of the secondary horizontal crosshair 31 described above. This is because the tertiary horizontal crosshair 32 can be associated with a different range, for example 400 yards, rather than the range of 300 yards with which the secondary horizontal crosshair 31 are associated. Thus, the scale along these respective secondary horizontal cross bars is different with respect to the width of known objects as described further below. Due to this, the lengths of subsequent or other secondary horizontal crosshairs 33 and 34 can become increasingly smaller, or narrower horizontally, being scaled to the greater ranges for example 500 yards and 600 yards which are represented by those respective secondary horizontal crosshairs. Further, each of the secondary horizontal bars can includes multiple pairs of vertical markings on opposing sides of the primary vertical crosshair to accommodate different objects of different widths at the different ranges associated with the respective secondary horizontal bar.

With reference to FIG. 2, the reticle optionally can include additional rows of indicia 25 and 26 under the fourth row of indicia. As mentioned above, each of these rows of indicia can include corresponding secondary horizontal cross bars 33 and 34 which are of lengths L3 and L4, that are progressively lesser than the lengths L1 and L2 of the other secondary horizontal crosshairs 31 and 32 respectively. These additional rows of indicia and their horizontal crosshairs can represent other ranges, for example, a third range of 500 yards and a fourth range of 600 yards for the respective row 25 and row 26. These rows also can include additional indicia or markings to the left and to the right of the primary vertical crosshair 20V. Although not shown, even further additional rows of indicia and or secondary horizontal crosshairs can be included in the reticle 10 to represent additional range estimating features.

Optionally, the secondary horizontal crosshairs need not be centered or associated with the primary vertical crosshair 20V. Instead, the secondary horizontal crosshairs and their associated vertical markings as described below can be offset from the crosshairs and rows of indicia entirely, for example, located as stand along items visible in the various upper and lower quadrants of the reticle 10.

Figure 4:
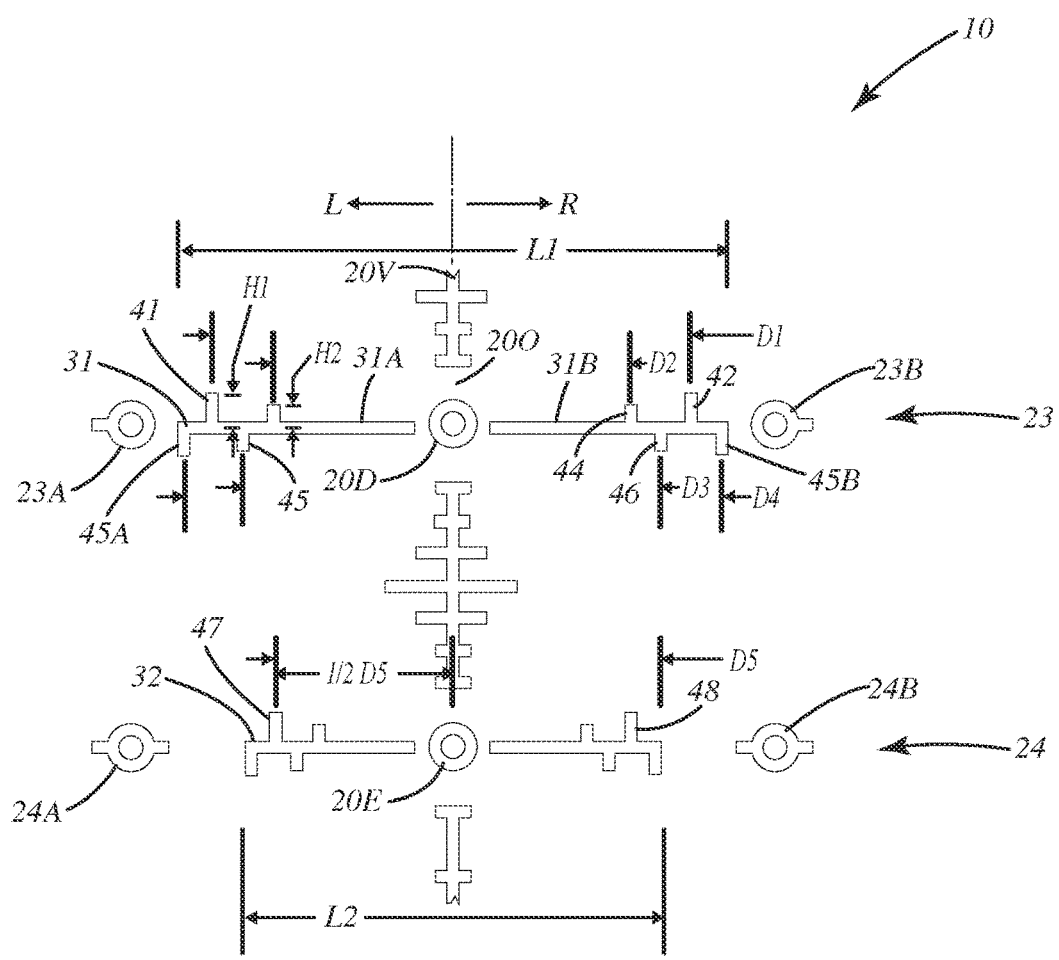
FIG. 4 is an enlarged view of secondary horizontal crosshairs with vertical range markings along a primary vertical crosshair.

With reference to FIG. 4, the secondary horizontal crosshair 31 and tertiary horizontal crosshair 32 will be described in more detail with reference to the associated ranging capabilities. In particular, as shown in FIG. 4, the secondary horizontal crosshair 31 is oriented within the third horizontal row of indicia 23. As mentioned above the crosshair 31 can extend from a first lateral side L to a second lateral side R of the primary vertical crosshair 20V between first 23A and second 23B indicia respectively. The crosshair and indicia can also lay along a common line on both lateral sides, without any offset vertically from one side to the other. The third horizontal row of indicia 23 can be associated with the first range different from the below noted second range, third range etc. This first range, for example 300 yards, can be specifically tailored and correspond to the scaling and size of the secondary horizontal crosshair 31. The secondary horizontal crosshair can include a first portion 31A that extends away from the central dot 20D on the first lateral side L. That dot can be aligned with the primary vertical crosshair 20V and centered in an opening 20O corresponding to an interruption in that primary vertical crosshair and/or holdover markings disposed above and/or below that dot 20D. The secondary horizontal crosshair 31 can include a second portion 31B that extends away from the central dot 20D and the second lateral side R, away from the primary vertical crosshair and the central dot 20D. These first and second portions may or may not be attached directly to the central dot 20D, depending on the application.

The secondary horizontal crosshair 31 can be constructed to include an assortment of vertical range markings extending upwardly and/or downwardly from the first and second portions. Optionally, the secondary horizontal crosshair and/or the first and second portions thereof can be minimized significantly so as not to connect respective vertical markings disposed laterally away from the primary vertical crosshair 20V. As shown in FIG. 4, the reticle 10 can include a first vertical range marking 41 projecting vertically away from the secondary horizontal crosshair 31 and in particular the portion 31A on the first lateral side L. This first vertical range marking 41 can be disposed between the central dot 20D and the first indicia 23A. A second vertical range marking 42 can project vertically away from the secondary horizontal crosshair 31 in particular the portion 31B on the second lateral side R of the primary vertical crosshair 20V. This second vertical range marking 42 can be disposed between the central dot 20D and the second indicia 23B. These first and second vertical range markings can be closer to the outwardly laterally disposed indicia 23A and 23B respectively.

Figure 5:
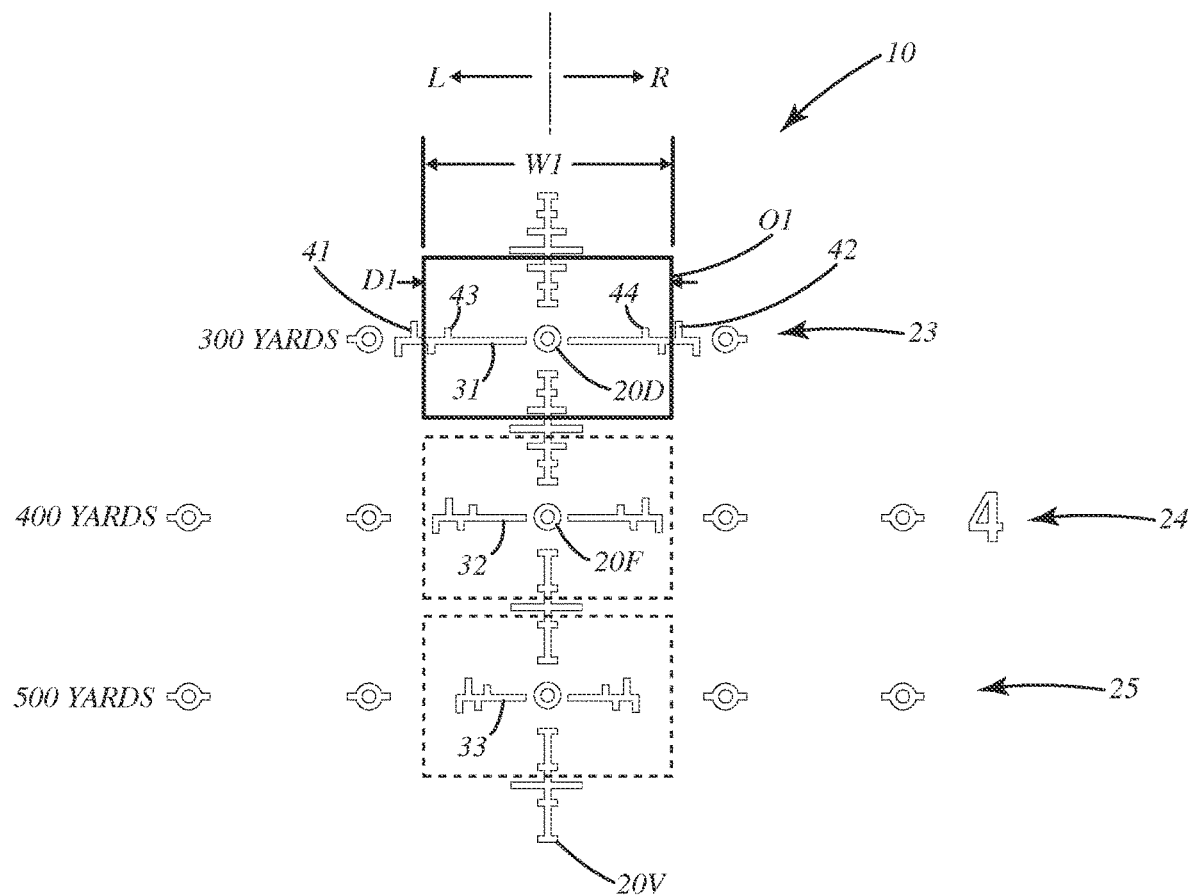
FIG. 5 is another enlarged view of the reticle while framing an object of known width within an appropriate set of vertical range markings of different secondary horizontal crosshairs associated with different ranges to determine an estimated range to the object.

The first vertical range marking 41 and the second vertical range marking 42 can be spaced a first distance D1 from one another. With reference to FIG. 5, this first distance D1 can correspond to a first width W1 of a first object O1 in the field of view of the user viewing the first object when that first object O1 is disposed at a particular range. As an example, this distance D1 can correspond to a first known width W1 of the first object O1 disposed at 300 yards, where the first width is 16 inches. As shown again in FIG. 5, that width W1 is framed or fits well between, and filling the space between, the first vertical marking 41 and second vertical marking 42 along the secondary horizontal crosshair 31. However, as shown further in FIG. 5, that width W1 of object O1 shown in broken lines does not correspond to or fit well between any of the distances between respective vertical markings on the tertiary horizontal crosshair 32 or the quaternary horizontal crosshair 33 as described in further detail below. Thus, because the width W1 matches the distance D1, which is scaled and thus known to correspond to a 16 inch target at 300 yards, the user can determine a first estimated range of 300 yards at which the first object O1 is disposed away from the reticle and the scope 1 and weapon 4 to which it is attached. After making this determination that the estimated range to the object O1 is 300 yards, the user can then, as shown in FIG. 2 move the reticle 10 so the aiming point or appropriate holdover AH overlaps the object O1. This aiming point AH can be calibrated and appropriate for a particular bullet drop compensation which is known to the user. The user thus can move the reticle relative to the first object O1 to center the appropriate aiming point, for example a particular dot or bar along the primary vertical crosshair 20V over the object O1 in the field of view of the scope and user. The user thus can be confident that a projectile fired from the weapon will engage the first object O1, having properly estimated its range using the reticle and vertical markings.

It will be noted here that although the ranging system described herein typically can be used to generally horizontally frame or reference a horizontal width of an object, the optical device can be rotated 90 degrees to generally vertically frame or reference an object having a known vertical height. Therefore, as used herein, the term width herein can also refer to a height of an object when repurposed in that manner.

Returning to FIG. 4, the reticle can include a third vertical range marking 43 projecting vertically away from the secondary horizontal crosshair 31 on the first lateral side L, distal from the first vertical range marking 41. This third vertical range marking 43 can be disposed between the first marking 41 and the central dot 20D. A fourth vertical range marking 44 can project vertically away from the secondary horizontal crosshair 31 and a second lateral side R, distal from the second vertical range marking 42. This fourth vertical range marking 44 can be disposed between the second marking 42 and the central dot 20D. It also can be closer to the second marking 42 then to the central dot. The third vertical marking 43 and the fourth vertical marking 44 can be spaced a second distance D2 from one another. This second distance can correspond to a second width of a second object in the field of view of the user viewing the reticle 10. This second known width of a second object can be for example 12 inches. Placement of the object with the second width, for example, 12 inches, between the third vertical marking the fourth vertical marking so that the edges of the second object lineup with those markings, for example so that the second width substantially corresponds to the second distance D2, can provide estimated range to the second object for the user. Using the particular markings 43 and 44 associated with distance D2, and framing a particular second object of a second width, for example, 12 inches, within those vertical range markings, can confirm for a user that the estimated range to the second object is 300 yards, the first range represented within the third row of indicia, using the same general procedure as that shown in FIG. 5 and described in connection with the first object O1 using the first known width W1. After this estimation of the range to the second object is determined by the user utilizing the third and fourth vertical markings, the user can select an aiming point or appropriate holdover AH along the primary vertical crosshair 20V, and align the second object O2 with that aiming point AH.

As can be seen from FIG. 4, the first 41, second 42, third 43 and fourth 44 vertical markings range markings extend upwardly away from the secondary horizontal cross bar 31 in particular the respective first portion 31A and second portion 31B on the respective first and second lateral sides of the primary vertical crosshair 20V. The crosshairs can increase in overall height the farther they are distance from the central dot 20D. For example, the first vertical range marking 41 is of a height H1 and the third vertical range marking 43 is of a second height H2. H1 can be greater than H2. Optionally, these heights can be reversed depending on the application. Further, there can be additional vertical range markings disposed between those particular vertical range markings and/or between the third vertical range marking 43 and the central dot 20D. Optionally, the number of vertical range markings disposed along the secondary horizontal cross bar 31 can be tempered to ensure that it does not become too confusing or too crowded.

Optionally, the reticle 10 can include a fifth vertical range marking 45 projecting vertically downwardly from the secondary horizontal crosshair 31 on the first lateral side L, distal from the first and third vertical range markings on that first lateral side. These first and third vertical range markings 41 and 43 can project oppositely, for example upwardly from the secondary horizontal crosshair on the first lateral side. The reticle can include a sixth vertical range marking 46 projecting vertically downwardly from the secondary horizontal crosshair 31 on the second lateral side R, distal from the second and fourth vertical range markings on that second lateral side. These second and fourth vertical range markings 42 and 44 can project oppositely, for example, upwardly from the secondary horizontal crosshair on the second lateral side. The fifth vertical marking 45 and the sixth vertical marking 46 can be spaced a third distance D3 from one another. This third distance can correspond to a third width of a third object in the field of view of the user viewing the reticle. This third width optionally can be 14 inches. Placement of that third width, for example of 14 inches, of a third object O3 between the fifth vertical marking 45 and the sixth vertical marking 46, so that the third width of that third object substantially corresponds to the third distance D3, can provide the first estimated range to the third object O3 for the user. If the third object again is of a width of 14 inches, and fits directly between the fifth and sixth 45 and 46 vertical markings, the user can estimate that the range to that third object is 300 yards. Thereafter, the user can place the object O3 that the appropriate holdover or aiming point AH as shown in FIG. 2 and have confidence that the range to that object is correct.

Further optionally, the reticle can include additional vertical markings 45A, 45B disposed laterally outwardly from the fifth 45 and sixth 46 markings. These markings can be disposed a distance D4 from one another. Optionally, this distance D4 can correspond to the known width of a fourth object having a fourth width of optionally 18 inches at the first range. By framing an object precisely between those outer vertical range markings, a user can determine that the first estimated range is 300 yards and can select the appropriate holdover or aiming point AH as described herein.

It will be appreciated that the reticle 10 can enable a user to effectively estimate range to an object or target by successfully framing the object between respective vertical markings along respective secondary vertical crosshairs. Framing refers to adjusting the reticle so that vertical markings flank an object on left and right sides thereof when the object is viewed through the reticle. If the user knows the size of an object, and in particular, the horizontal width of a target from side to side in inches, or some other measurement such as centimeters, the user can frame the width of that object between respective vertical markings and quickly estimate the approximate actual range to the target or object. The user can memorize the values for the distances D1, D2, D3, D4, etc. As example, those distances can be established where D1 can correspond to a known object width of 16 inches, D2 can correspond to a known object width of 12 inches, D3 can correspond to a known object width of 14 inches and D4 can correspond to a known object width of 18 inches at any given range along any row or secondary horizontal crosshair. Optionally, the distances D1, D2, D3 etc. can correspond to the known width of the objects for each of the secondary crosshairs 31, 32, 33 etc. at the varying different first range, second range, third range, or other ranges depending on the configuration of the reticle. Again, a user can simply identify an object of a known width through the scope 1, and pass the vertical markings over that object until the width of the object matches a distance between respective vertical markings along one of the respective rows 23, 24, 25, 26 etc. When the width of the object matches a particular distance between vertical markings, the user can relatively accurately estimate range based on which row the object is framed.

Returning to FIG. 4, as mentioned above, the reticle 10 can include a fourth horizontal row of indicia 24. This row can include a tertiary horizontal crosshair, which is simply another secondary horizontal crosshair, 32 extending on the first lateral side L1 and on the second lateral side R, away from the primary vertical crosshair toward first 24A and second 24B indicia respectively. The fourth horizontal row of indicia or the tertiary horizontal crosshair can be associated with a second range that is different from the ranges associated with the respective rows 21, 22 and 23 described above. This tertiary horizontal crosshair can include a seventh vertical range marking 47 (sometimes referred to as a third vertical range marking herein) projecting vertically away from the it on the first lateral side L, as well as an eighth vertical range marking 48 (sometimes referred to as a fourth vertical range marking herein) projecting vertically away from it on the second lateral side R. These seventh and eighth vertical markings can be spaced a fifth distance D5 (sometimes referred to as a second distance herein) from one another. This fifth distance D5 can correspond to a first known width W1 of the first object O1 in a field of view of the user viewing the reticle, when the first object O1 is disposed at a second range for example, 400 yards. Optionally, the width W1 can be 16 inches for the first object O1. However, when the width W1 fits between the markings 47 and 48 along the tertiary horizontal crosshair 32, this indicates to the user that the estimated range to the first object O1 is another estimated range different from the first estimated range of 300 yards. That other estimated range can be referred to as a second estimated range, which in this example, optionally can be the second range of 400 yards. Of course, these different estimated ranges can change depending on the scale used to set the distances between respective vertical markings. With this knowledge of the second estimated range, the user can estimate that the range to the object is approximately 400 yards and place the appropriate holdover AH, also referred to as an aiming point of the reticle herein, overlapping the first object O1 knowing the estimated range to the first object, as shown for example in FIG. 2. The other upward and downward oriented vertical range markings extending from the tertiary horizontal reticle 32 can correspond to other known widths of second, third and fourth objects, for example, 12 inches, 14 inches and 18 inches. Thus again, if a user can frame an object of a known width perfectly between vertical markings along the tertiary horizontal crosshair 32, the user can estimate the range as being the second estimated range, and can use that information to place an aiming point or appropriate holdover of the reticle 10 on the object to make a shot using the weapon 4 to which the optical device 1 is joined.

FIG. 4 also illustrates that certain distances between vertical markings can be divided in half to frame certain objects of different widths and thereby estimate range to those objects. For example, as mentioned above the distance D5 between the seventh 47 and eighth 48 vertical markings corresponds to a distance D5. This distance D5 can correspond to an object having a known width 16 inches at a second range of 400 yards corresponding to the tertiary horizontal crosshair 32. The distance ½ D5, which is disposed between the seventh vertical marking 47 and the primary vertical crosshair 20V, or the crosshair 20V and the eighth vertical marking 48, however, can correspond to an object of an exemplary known width of 8 inches at the second range of 400 yards. Likewise any of the other distances D1, D2, D3, D4 associated with the secondary horizontal crosshair 31 described above can correspond to known widths of objects being half the widths W1, W2 etc. described above, for example 8 inches, 6 inches, 7 inches or 9 inches depending on the application and the particular vertical markings used. In this manner, a multitude of objects of different known sizes can be framed within or between vertical markings and the primary vertical crosshair to estimate range to those particular objects.

Figure 6:
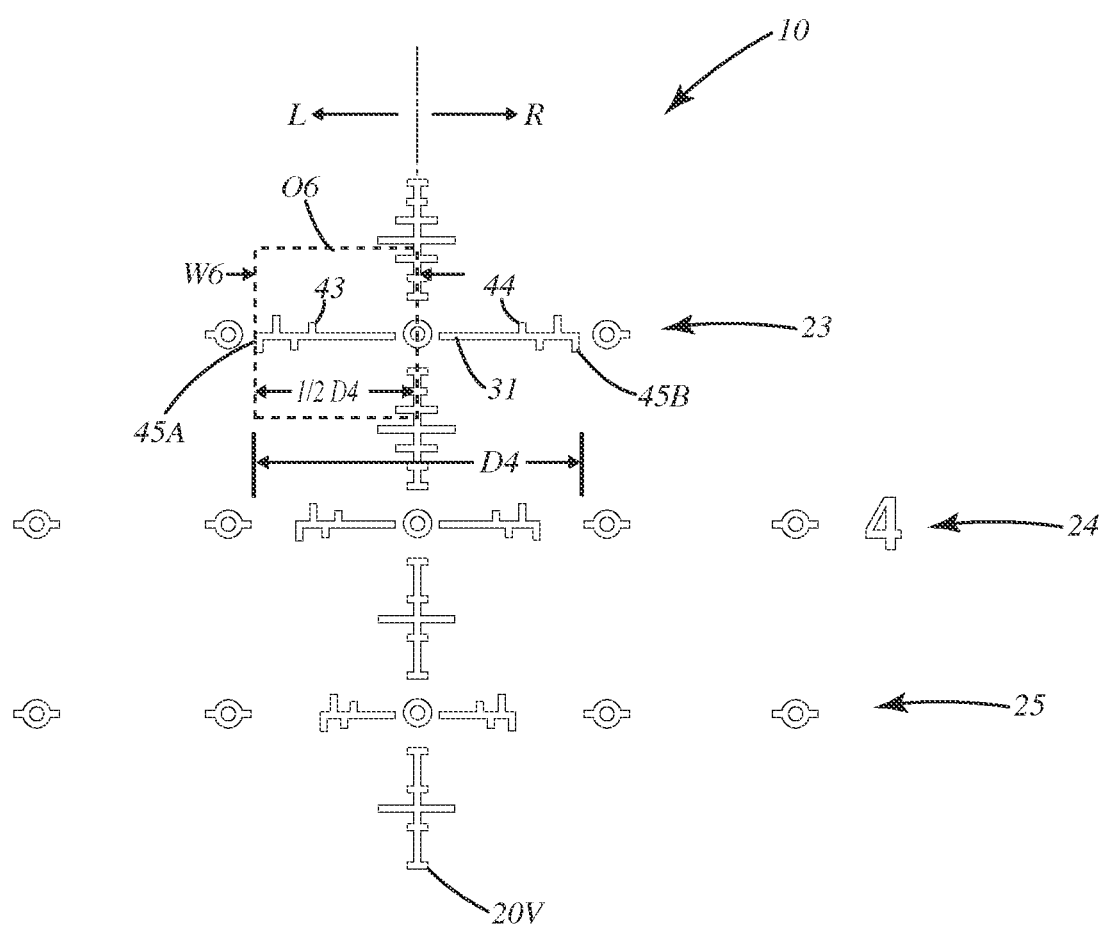
FIG. 6 is still another enlarged view of the reticle while framing another object of another known width between a vertical range marking on a lateral side of the primary vertical crosshair and the primary vertical crosshair itself.

FIG. 6 shows another example of how the vertical markings can be used in conjunction with the primary vertical crosshair 20V to frame yet another object, for example a sixth object O6 having a width W6. In this example, the third row of indicia 23, which corresponds to the first range of optionally 300 yards, is overlapped with the object O6 within a field of view of the reticle 10. This contrasts the example in FIG. 4 which used the fourth row of indicia 24 and the tertiary horizontal crosshair 32. In FIG. 6, the sixth object O6 has a width W6. As previously discussed above, the secondary horizontal line 31 includes outer vertical markings 45A and 45B. These outer vertical markings are set apart a distance D4, which optionally can be 18 inches. Taking these vertical markings and subdividing them at the primary vertical crosshair 20V can provide a sub-distance of ½ D4 between the primary vertical crosshair 20V and the vertical marking 45A on the left side of the primary vertical crosshair. With the particular nonlimiting example, this distance ½ D4 can correspond to a known width of a 9 inch object at 300 yards. Thus, by moving the reticle and a variety of different vertical markings around and over the sixth object O6 until that object is overlapped at opposing sides of the width W6 by the vertical marking 45A and the primary vertical crosshair 20V, the user can properly frame that object O6 and its width W6 within the distance ½ D4 between the vertical marking and the vertical crosshair. When this is achieved, the user can thus estimate the range to correspond to the first range of the secondary horizontal crosshair 31, in this example, 300 yards. The user can then use this estimated range of 300 yards and move an aiming point AH or appropriate holdover as shown in FIG. 2 so that it overlaps the object O6. The user can then engage the target with the weapon with a level of confidence that they have appropriately ranged the object at the appropriate range and compensated for the drop of the projectile as it travels toward the object after having been shot from the weapon 4.

Methods of using the optical device reticle of the current embodiments will now briefly be described here. On a high level, the method can include providing the reticle having the primary vertical crosshair 20V and the primary horizontal crosshair 20H, and framing a first object having a first width that is known to the user, so that the first width is horizontally disposed between a first vertical marking and a second vertical marking disposed along a secondary horizontal crosshair. By framing the first width between selected ones of the vertical markings along the secondary horizontal crosshair, a user of the reticle can estimate a first estimated range to the first object. The user optionally can move the reticle vertically up and down to frame the object of a known width between any one of a number of corresponding paired vertical range markings along any one of the ranges. When the user finds a match between the known width, for example W1 of an object O1 shown in FIG. 5, and a particular distance, for example D1 between respective vertical markings associated with a particular secondary crosshair which is further associated with a particular range, the user then can estimate or determine that the actual range the target is that or close to that particular range.

As shown in FIG. 2, the user can move the reticle 10 so that the first object O1 or some other object O2, O3 of other widths, ranged with the reticle, is overlapped with a particular aiming point or appropriate holdover AH. In so doing, the first object can be moved closer to the secondary horizontal crosshair or the tertiary horizontal crosshair or some other cross hair disposed along the vertical primary vertical crosshair 20V. Generally, the user can move the reticle based on the estimated range up or down to a variety of different aiming points or appropriate holdover markings AH along the primary vertical crosshair 20V. Of course, if the user also wants to compensate for wind or movement of target, the user can correspondingly move the reticle laterally to overlap different ones of the associated indicia.

Figure 7:
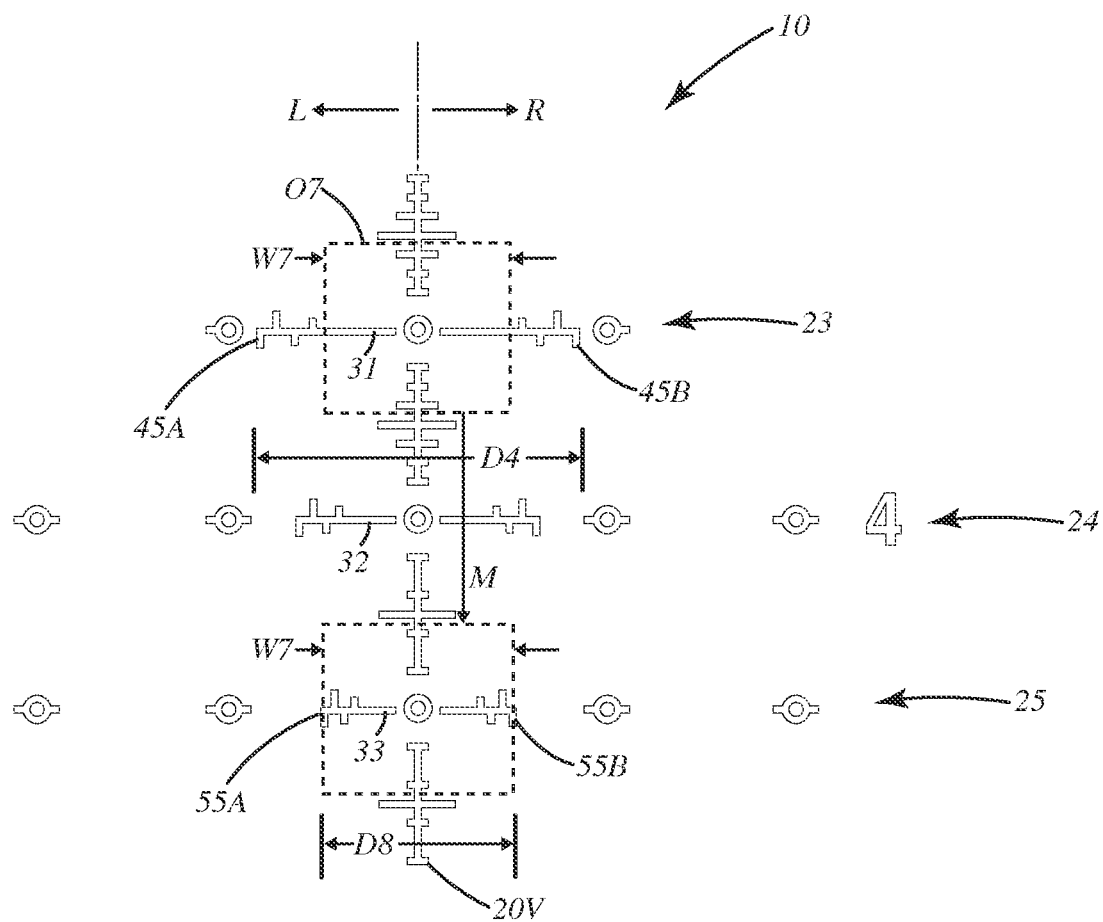
FIG. 7 is yet another enlarged view of the reticle while framing another object of another known width within another appropriate set of vertical range markings of a different secondary horizontal crosshair associated with a range to estimate a range to the object.

Another example of a method of using the reticle 10 is illustrated in FIG. 7. There, a user moves the reticle 7 so as to overlap an object O7 initially with the row of indicia 23 and the vertical markings 45A, 45B associated with the second horizontal crosshair or bar 31. The user can know that the object O7 has a width W7 which for exemplary purposes is equal to about 17 inches. By placing the object O7 along the secondary horizontal crosshair or bar 31, the user can quickly see that the object, shown in broken lines there, does not fit well or extend fully between the outermost vertical markings 45A and 45B which have a distance D4 corresponding to a width of an object of 18 inches at the first range associated with the secondary horizontal crosshair 31. Again, as an example, that first range can be 300 yards. The user thus can know that the seventh object O7 having the width W7 is not at the first range of 300 yards because the 17 inch width W7 does not fit well and extend across the distance D4 between the vertical markings 45A and 45B. Further, the user then knows that the estimated range is not that first range.

Accordingly, the user can move the reticle 10 such that the object O7 moves in direction M until it overlaps the quaternary horizontal crosshair 33, which is simply another secondary horizontal crosshair or bar, and disposed along the fifth row of indicia 25. This quaternary horizontal crosshair or bar can correspond to a third range, for example 500 yards. The user can then frame the width W7 of the seventh object O7 between the outermost vertical markings 55A and 55B along the quaternary horizontal crosshair 33. These vertical markings are spaced a distance D8 which corresponds to the known width of an object that is 18 inches at 500 yards. The user can thus frame the seventh object O7 between those vertical markings 55A and 55B, and substantially within the distance D8 between those markings. While there is a slight discrepancy between 18 inches represented by the distance D8 at the third range, for example 500 yards, the user can estimate that the width W7, which corresponds to the known width of the object O7 of 17 inches, fits well enough within the vertical markings to estimate that the range to the object O7 is about 500 yards. The user can thus move the reticle 10 relative to the object O7 as shown in FIG. 2 to a known aiming point AH2 which corresponds to an appropriate holdover for the object O7 at 500 yards to compensate for any bullet drop when the weapon is fired at the seventh object O7.

Optionally, alphanumeric markings can identify at least some of the rows of indicia and/or secondary crosshairs, which can correspond to different ranges. The primary horizontal crosshair can intersect the primary vertical crosshair at the optical center of the reticle, or the primary horizontal crosshair can intersect the primary vertical crosshair above or below the optical center of the reticle. Further optionally, the secondary horizontal crosshair, tertiary horizontal cross hair, etc., all referred to as the secondary horizontal cross hairs herein, can be evenly and/or unevenly spaced at predetermined distances along the primary vertical crosshair. In some cases, two or more vertical markings can be evenly spaced at predetermined distances along at least some of the secondary horizontal crosshairs, and/or on first and second lateral sides on opposite sides of the primary vertical crosshair. In other cases, at least some of the vertical markings can be unevenly spaced at predetermined distances along the primary horizontal crosshair and/or at least one of the secondary horizontal crosshair.

It will be appreciated that by identifying or naming herein certain rows, crosshairs or any other element as first, second, third, etc., that does not require that there always be a certain number of rows preceding, succeeding, above, below, adjacent and/or near the numbered rows, crosshairs or other element. Further, one row or element, for example, a third row, a third indicia, a third mil dot, etc., alternatively can be referred to as a first, second, fourth or other numbered row or element. The same is true for the naming of any other elements in the form of a first element, second element and third element etc. as used herein. Further, although the different components of the reticle are described herein as having certain functional characteristics, each component and its relation to other components can be depicted or oriented in a variety of different aesthetic configurations, which support the ornamental and aesthetic aspects of the reticle. Simply because a reticle or one or more of its elements is described herein as having a function does not mean that reticle, or one or more of its elements, and orientation or configuration is not purely aesthetic and/or ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. An optical device reticle, comprising:
   a primary horizontal crosshair;
   a primary vertical crosshair that is substantially perpendicular to the primary horizontal crosshair;
   a first horizontal row of indicia below the primary horizontal crosshair;
   a second horizontal row of indicia below the primary horizontal crosshair including at least one indicia to the left and at least one indicia to the right of the primary vertical crosshair;
   a third horizontal row of indicia below the primary horizontal crosshair, the third horizontal row of indicia including a secondary horizontal crosshair extending on a first lateral side and on a second lateral side away from a secondary horizontal crosshair dot laying along the primary vertical crosshair toward first and second indicia, respectively, the third horizontal row of indicia associated with a first range, the secondary horizontal crosshair interrupted by a secondary opening adjacent the secondary horizontal crosshair dot such that the secondary horizontal crosshair is discontinuous with the secondary horizontal crosshair dot;
   a first vertical range marking projecting vertically upward, but not downward from the secondary horizontal crosshair on the first lateral side;
   a second vertical range marking projecting vertically upward, but not downward from the secondary horizontal crosshair on the second lateral side;
   a tertiary horizontal crosshair below the secondary horizontal crosshair, the tertiary horizontal crosshair extending on the first lateral side and on the second lateral side away from a tertiary horizontal crosshair dot laying along the primary vertical crosshair, the tertiary horizontal crosshair associated with a second range, the tertiary horizontal crosshair interrupted by a tertiary opening adjacent the tertiary horizontal crosshair dot such that the tertiary horizontal crosshair is discontinuous with the tertiary horizontal crosshair dot;
   a third vertical range marking projecting vertically upward, but not downward from the tertiary horizontal crosshair on the first lateral side; and
   a fourth vertical range marking projecting vertically upward, but not downward from the tertiary horizontal crosshair on the second lateral side,
   wherein the first vertical marking and the second vertical marking are spaced a first distance from one another,
   wherein the first distance corresponds to a first width of a first object in a field of view of a user viewing the reticle,
   wherein placement of the first width of the first object between the first vertical marking and the second vertical marking so that the first width substantially corresponds to the first distance provides a first estimated range to the first object for the user,
   whereby the user can place an aiming point of the reticle over the first object knowing the first estimated range to the first object,
   wherein the third vertical marking and the fourth vertical marking are spaced a second distance from one another,
   wherein the second distance corresponds to the first width of the first object in the field of view of the user viewing the reticle,
   wherein placement of the first width of the first object between the third vertical marking and the fourth vertical marking on the tertiary horizontal crosshair so that the first width substantially corresponds to the second distance provides a second estimated range to the first object for the user which is different from the first estimated range,
   whereby the user can place another aiming point of the reticle over the first object, the another aiming point corresponding to the second estimated range to the first object,
   wherein the third vertical marking is below the first vertical marking and separated therefrom by a first open space so that the third vertical marking and the first vertical marking are discontinuous,
   wherein the fourth vertical marking is below the second vertical marking and separated therefrom by a second open space so that the fourth vertical marking and the second vertical marking are discontinuous.

2. The reticle of claim 1,
   wherein the secondary horizontal crosshair includes a first portion that extends away from the secondary horizontal crosshair dot on the first lateral side,
   wherein the secondary horizontal crosshair dot is aligned with the primary vertical crosshair,
   wherein the secondary horizontal crosshair includes a second portion that extends away from the secondary horizontal crosshair dot on the second lateral side of the primary vertical crosshair,
   wherein the primary vertical crosshair is interrupted by another secondary opening adjacent the secondary horizontal crosshair dot such that the primary vertical crosshair is discontinuous with the secondary horizontal crosshair dot.

3. The reticle of claim 2,
   wherein the primary vertical crosshair comprises a straight line,
   wherein the secondary horizontal crosshair dot is in the form of an open circle within the another secondary opening.

4. The reticle of claim 1,
   wherein the primary vertical crosshair is an interrupted straight line having a first opening immediately adjacent and above the secondary horizontal crosshair dot, and a second opening immediately adjacent and below the secondary horizontal crosshair dot, and having a third opening immediately adjacent and above the tertiary horizontal crosshair dot, and a fourth opening immediately adjacent and below the tertiary horizontal crosshair dot.

5. The reticle of claim 1,
   wherein the third horizontal row of indicia is below the second row of indicia,
   wherein the second row of indicia is below the first row of indicia,
   wherein the first row of indicia is below the primary horizontal crosshair.

6. The reticle of claim 1, comprising:
another vertical range marking projecting vertically away from the secondary horizontal crosshair on the first lateral side, farther from the primary vertical crosshair than the first vertical range marking, the another vertical range marking having another height greater than a first height of the first vertical range marking; and
a further vertical range marking projecting vertically away from the secondary horizontal crosshair on the second lateral side, farther away from the primary vertical crosshair than the second vertical range marking, the further vertical range marking having a further height greater than a second height of the second vertical range marking.

7. The reticle of claim 6,
wherein the first vertical range marking, the another vertical range marking, the second vertical range marking and the further vertical range marking are directly connected to the secondary horizontal crosshair.

8. An optical device reticle, comprising:
a primary horizontal crosshair;
a primary vertical crosshair that is substantially perpendicular to the primary horizontal crosshair;
a secondary horizontal crosshair extending on a first lateral side and on a second lateral side away from the primary vertical crosshair, the secondary horizontal crosshair associated with a first range, the secondary horizontal crosshair interrupted by a secondary opening adjacent a secondary horizontal crosshair dot such that the secondary horizontal crosshair is discontinuous with the secondary horizontal crosshair dot;
a first vertical range marking projecting vertically upward, but not downward from the secondary horizontal crosshair;
a second vertical range marking projecting vertically upward, but not downward from the secondary horizontal crosshair;
a tertiary horizontal crosshair extending on the first lateral side and on the second lateral side away from the primary vertical crosshair, the tertiary horizontal crosshair associated with a second range different from the first range, the tertiary horizontal crosshair interrupted by a tertiary opening adjacent a tertiary horizontal crosshair dot such that the tertiary horizontal crosshair is discontinuous with the tertiary horizontal crosshair dot;
a third vertical range marking projecting vertically upward, but not downward from the tertiary horizontal crosshair on the first lateral side;
a fourth vertical range marking projecting vertically upward, but not downward from the tertiary horizontal crosshair on the second lateral side,
wherein the first vertical marking and the second vertical marking are spaced a first distance from one another,
wherein the first distance corresponds in whole or part to a first width of a first object in a field of view of a user viewing the reticle,
wherein the third vertical marking and the fourth vertical marking are spaced a second distance from one another,
wherein the third vertical marking and the fourth vertical marking are spaced vertically below and separated from the first vertical marking and the second vertical marking, respectively,
wherein the second distance corresponds in whole or part to the first width of the first object in the field of view of the user viewing the reticle,
wherein placement of the first width of the first object between the first vertical marking and the second vertical marking so that the first width substantially corresponds in whole or part to the first distance provides a first estimated range to the first object, the first estimated range corresponding to the first range,
wherein placement of the first width of the first object between the third vertical marking and the fourth vertical marking so that the first width substantially corresponds in whole or part to the second distance provides a second estimated range to the first object for the user, said second estimated range is different from the first estimated range,
whereby the user can place the first width between the first and second vertical markings and between the third and fourth vertical markings, and depending on whether the first width substantially corresponds in whole or part to the first distance or the second distance, determine an aiming point along the primary vertical crosshair to properly aim at the first object using the reticle.

9. A method of using an optical device reticle comprising:
providing a primary vertical crosshair that is substantially perpendicular to a primary horizontal crosshair and a first horizontal row of indicia below the primary horizontal crosshair; and
framing a first object having a first width such that the first width is disposed between a first vertical marking and a second vertical marking disposed along a secondary horizontal crosshair that is vertically offset below both the first horizontal row of indicia and the primary horizontal crosshair, the secondary horizontal crosshair corresponding to a first range, the secondary horizontal crosshair interrupted by a secondary opening adjacent a secondary horizontal crosshair dot such that the secondary horizontal crosshair is discontinuous with and separated from the secondary horizontal crosshair dot,
wherein the first vertical marking extends upward a first height from the secondary horizontal crosshair, but does not extend below the secondary horizontal crosshair, and terminates below the primary horizontal crosshair and below the first horizontal row of indicia,
wherein the second vertical marking extends upward a second height from the secondary horizontal crosshair, but does not extend below the secondary horizontal crosshair, and terminates below the primary horizontal crosshair and below the first horizontal row of indicia,
wherein the primary vertical crosshair is an interrupted straight line having a first opening immediately adjacent and above the secondary horizontal crosshair dot, and a second opening immediately adjacent and below the secondary horizontal crosshair dot,
whereby a user of the reticle can estimate a first estimated range to the first object.

10. The method of claim 9 comprising:
framing the first object having the first width such that the first width is horizontally disposed between a third vertical marking and a fourth vertical marking disposed along a tertiary horizontal crosshair that is vertically offset from the primary horizontal crosshair and the secondary horizontal crosshair, the tertiary horizontal crosshair corresponding to a second range; and
determining whether the first range or the second range is closer to the first estimated range based on the framing,
wherein the first vertical marking is disposed above and spaced distally upward from the third vertical marking and disposed along the secondary horizontal crosshair, wherein the second vertical marking is disposed above and spaced distally upward from the fourth vertical marking and disposed along the secondary horizontal crosshair.

11. The method of claim 10 comprising:
moving the reticle so that the first object is closer to the secondary horizontal crosshair or the tertiary horizontal crosshair.

12. The method of claim 9 comprising:
estimating the first estimated range based on the framing; and
moving the reticle based on the estimating to place an aiming point over the first object.

13. The method of claim 12, comprising:
framing the first object having the first width such that the first width is horizontally disposed between a third vertical marking and a fourth vertical marking disposed along a tertiary horizontal crosshair that is vertically offset from the primary horizontal crosshair and the secondary horizontal crosshair, the tertiary horizontal crosshair corresponding to a second range,
wherein the first vertical marking and the second vertical marking are separated by a first distance,
wherein the third vertical marking and the fourth vertical marking are separated by a second distance,
wherein the first width is about equal to the first distance,
wherein the estimating includes determining that the first estimated range is about equal to the first range, rather than the second range,
wherein the third vertical marking is of a third height,
wherein the fourth vertical marking is of a fourth height,
wherein the first height terminates short of and below the first horizontal row of indicia and below the primary horizontal crosshair,
wherein the second height terminates short of and below the first horizontal row of indicia and below the primary horizontal crosshair,
wherein the third height terminates short of and below the secondary horizontal crosshair and below the primary horizontal crosshair,
wherein the fourth height terminates short of and below the secondary horizontal crosshair and below the primary horizontal crosshair.

14. The method of claim 9, comprising:
framing the first object having the first width such that the first width is horizontally disposed between a third vertical marking and a fourth vertical marking disposed along a tertiary horizontal crosshair that is vertically offset from the primary horizontal crosshair and the secondary horizontal crosshair, the tertiary horizontal crosshair corresponding to a second range; and
moving the reticle so that the first object is closer to the secondary horizontal crosshair corresponding to the first range or to the tertiary horizontal crosshair corresponding to the second range.

15. The method of claim 9,
wherein the first vertical marking intersects and extends directly from the secondary horizontal crosshair on a first lateral side of the primary vertical crosshair,
wherein the second vertical marking intersects and extends directly from the secondary horizontal crosshair on a second lateral side of the primary vertical crosshair.

16. A method of using an optical device reticle comprising:
providing a primary vertical crosshair that is substantially perpendicular to a primary horizontal crosshair;
framing a first object having a first width such that the first width is horizontally disposed between a first vertical marking and a second vertical marking disposed along and extending only upward from a secondary horizontal crosshair corresponding to a first range and interrupted by a secondary opening adjacent a secondary horizontal crosshair dot such that the secondary horizontal crosshair is discontinuous with and separated from the secondary horizontal crosshair dot;
framing the first object having the first width such that the first width is horizontally disposed between a third vertical marking and a fourth vertical marking disposed along and extending only upward from a tertiary horizontal crosshair corresponding to a second range; and
estimating a first estimated range based on at least one of the framing steps,
wherein the third vertical marking extends upward from the tertiary horizontal crosshair without extending above the secondary horizontal crosshair,
wherein the fourth vertical marking extends upward from the tertiary horizontal crosshair without extending above the secondary horizontal crosshair,
wherein the primary vertical crosshair is an interrupted straight line having a first opening immediately adjacent and above the secondary horizontal crosshair dot, and a second opening immediately adjacent and below the secondary horizontal crosshair dot.

17. The method of claim 16,
wherein the first vertical marking and the second vertical marking intersect and extend only upwardly from the secondary horizontal crosshair on left and right sides of the primary vertical cross hair,
wherein another vertical marking intersects and extends only upwardly from the secondary horizontal crosshair on the left side of the primary vertical crosshair farther from the primary vertical crosshair than the first vertical marking,
wherein the first vertical marking is of a first height,
wherein the another vertical marking is of a second height,
wherein the first height is different from the second height.

18. The method of claim 16 comprising:
moving the reticle so that the first object is overlapped by an aiming point of the reticle corresponding to the first range or corresponding to the second range.

19. The method of claim 16 comprising:
moving the primary vertical crosshair right relative to the first object to position the first width between the primary vertical crosshair and at least one of the first vertical marking and another vertical marking that intersects and extends upwardly from the secondary horizontal crosshair on a left side of the primary vertical crosshair farther from the primary vertical crosshair than the first vertical marking.

20. The method of claim 16,
wherein each of the first vertical marking, second vertical marking, third vertical marking and fourth vertical marking is a linear, vertical line.

* * * * *